(12) United States Patent
Evert et al.

(10) Patent No.: US 10,652,043 B2
(45) Date of Patent: May 12, 2020

(54) COMMUNICATION REGULATION IN COMPUTING SYSTEMS

(71) Applicant: GE Aviation Systems LLC, Grand Rapids, MI (US)

(72) Inventors: Keith Douglas Evert, Palm Harbor, FL (US); Daniel Levi Sharp, Safety Harbor, FL (US); Mitchell Winter, Palm Harbor, FL (US); Christopher Robert Eckert, East Grand Rapids, MI (US)

(73) Assignee: G.E. Aviation Systems, LLC, Grand Rapids, MI (US)

( * ) Notice: Subject to any disclaimer, the term of this patent is extended or adjusted under 35 U.S.C. 154(b) by 109 days.

(21) Appl. No.: 15/181,519

(22) Filed: Jun. 14, 2016

(65) Prior Publication Data
US 2017/0359196 A1 Dec. 14, 2017

(51) Int. Cl.
*H04L 12/40* (2006.01)
*G06F 9/4401* (2018.01)
(Continued)

(52) U.S. Cl.
CPC ........ *H04L 12/40143* (2013.01); *B64D 47/00* (2013.01); *G06F 9/4411* (2013.01);
(Continued)

(58) Field of Classification Search
CPC ............. H04L 12/40143; H04L 41/145; H04L 67/1008; H04L 2012/4028; B64D 47/00; G06F 9/4411; G06F 21/76
(Continued)

(56) References Cited

U.S. PATENT DOCUMENTS 7,263,631 B2  8/2007  VanBuren
7,353,090 B2  4/2008  Leonard et al.
(Continued)

FOREIGN PATENT DOCUMENTS

EP    1 517 236 A2   3/2005
WO   2007/067279 A2  6/2007

OTHER PUBLICATIONS

Bianco, A. et al., "Boosting the performance of PC-based software routers with FPGA-enhanced network interface cards",IEEE Workshop on High Performance Switching and Routing, pp. 1-2 (Jun. 7-9, 2006).
(Continued)

*Primary Examiner* — Joseph L Greene
(74) *Attorney, Agent, or Firm* — Dority & Manning, P.A.

(57) ABSTRACT

Systems and methods for regulating communications in computing systems are provided. For instance, a computing system can include a first processing board including a first processing device and a first control device. The system can further include a second processing board including a second processing device and a second control device. The system can further include a communications interface communicatively coupled to the first processing board. The communications interface includes one or more input/output ports configured to facilitate communication between the avionics system and one or more external devices. The first control device of the first processing board is communicatively coupled to the second control device of the second processing board via a shared bus. The first control device is configured to regulate communications associated with the communications interface.

20 Claims, 3 Drawing Sheets

(51) Int. Cl.
*G06F 21/85* (2013.01)
*G06F 21/76* (2013.01)
*B64D 47/00* (2006.01)
*H04L 12/24* (2006.01)
*H04L 29/08* (2006.01)

(52) U.S. Cl.
CPC .............. *G06F 21/76* (2013.01); *G06F 21/85* (2013.01); *H04L 41/145* (2013.01); *H04L 67/1008* (2013.01); *H04L 2012/4028* (2013.01)

(58) Field of Classification Search
USPC ....................................................... 709/225
See application file for complete search history.

(56) References Cited

U.S. PATENT DOCUMENTS

| | | |
|---|---|---|
| 7,921,323 B2 | 4/2011 | Yancey et al. |
| 8,862,290 B1 | 10/2014 | Ali |
| 9,002,693 B2 | 4/2015 | Asaad et al. |
| 9,156,543 B2 | 10/2015 | De Rammelaere et al. |
| 2005/0256969 A1 | 11/2005 | Yancey et al. |
| 2010/0228854 A1* | 9/2010 | Morrison ................. H04L 29/00 709/224 |
| 2012/0066751 A1 | 3/2012 | Nutaro et al. |
| 2013/0103660 A1 | 4/2013 | Welsh et al. |
| 2013/0205301 A1* | 8/2013 | Easwaran ............. G06F 9/4881 718/104 |
| 2013/0232328 A1* | 9/2013 | Johnson .................... G06F 8/60 713/2 |
| 2013/0297704 A1* | 11/2013 | Alberth, Jr. ........... H04L 67/303 709/205 |
| 2016/0318626 A1* | 11/2016 | Gansmandel ....... H04L 12/6418 |
| 2017/0153073 A1* | 6/2017 | Bumgardner ...... G05D 23/1934 |
| 2017/0271755 A1* | 9/2017 | Troxel ................... H01Q 25/50 |

OTHER PUBLICATIONS

Extended European Search Report and Opinion issued in connection with corresponding EP Application No. 17174358.6 dated Sep. 19, 2017.

Office Action issued in connection with corresponding CA Application No. 2968979 dated Mar. 21, 2018.

* cited by examiner

COMMUNICATION REGULATION IN COMPUTING SYSTEMS

FIELD OF THE INVENTION

The present subject matter relates generally avionics computing systems and more particularly to regulating communication in avionics computing systems.

BACKGROUND OF THE INVENTION

Avionics computing systems can include multiple processing devices that are configured to host one or more software applications. Hosting software applications on different hardware devices can allow partitioning of different software DAL level applications, or partitioning for purposes of integrating multiple different software products into a single system. Such software applications and/or processing devices can be associated with various design assurance levels (DALs) specifying a level of rigor used in the development and implementation of the software applications. For instance, systems that include multiple DAL levels must take measures to protect a higher DAL level processor from receiving corrupted data associated with a lower DAL level.

Conventional systems wherein different software applications communicate with each other may implement software techniques for preventing such corruption of data between the different software applications. In such conventional systems, the higher DAL level software may act as a gatekeeper of input/output (I/O) data to ensure that the data supports the higher DAL software application as well as the lower DAL software application. For instance, a lower DAL level processing device can provide a communication request to the higher DAL level processing device, and the higher DAL level processing device can determine whether to grant the lower DAL level processing device communication access to an I/O interface or to maintain the communication to support the higher DAL level processing.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a computing system. The system includes a first processing board comprising a first processing device and a first control device. The system further includes a second processing board comprising a second processing device and a second control device. The system further includes a communications interface communicatively coupled to the first processing board. The communications interface includes one or more input/output ports configured to facilitate communication between the computing system and one or more external devices. The first control device of the first processing board is communicatively coupled to the second control device of the second processing board via a shared bus. The first control device is configured to regulate communications associated with the communications interface.

Another example aspect of the present disclosure is directed to an aircraft. The aircraft includes one or more computing systems. The one or more computing systems include a first processing device coupled to a first control device. The one or more computing systems further include a second processing device coupled to a second control device. The one or more computing systems further include a communications interface communicatively coupled to the first control device. The communications interface includes one or more communication ports configured to facilitate communication between the computing system and one or more external devices. The first control device is communicatively coupled to the second control device via a shared bus. The first control device is configured to regulate communications associated with the communications interface.

Yet another example aspect of the present disclosure is directed to a method of regulating data associated with a computing system. The method includes receiving, by a first control logic device associated with a computing device, a communication request to gain communication access to a communication port associated with a communications interface of a computing system. The computing system includes a first processing board including a first processing device and the first control logic device. The computing system further includes a second processing board including a second processing device and a second control logic device. The first control logic device is coupled to the second control device via a shared bus. The method further includes identifying, by the first control logic device, a current communications status associated with the communication port. The method further includes determining, by the first control logic device, a priority order associated with the computing system. The method further includes determining, by the first control logic device, a priority order associated with the computing system. The method further includes providing, by the first control logic device, access to the communication port to the first processing device or the second processing device based at least in part on the communications status and the priority order.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
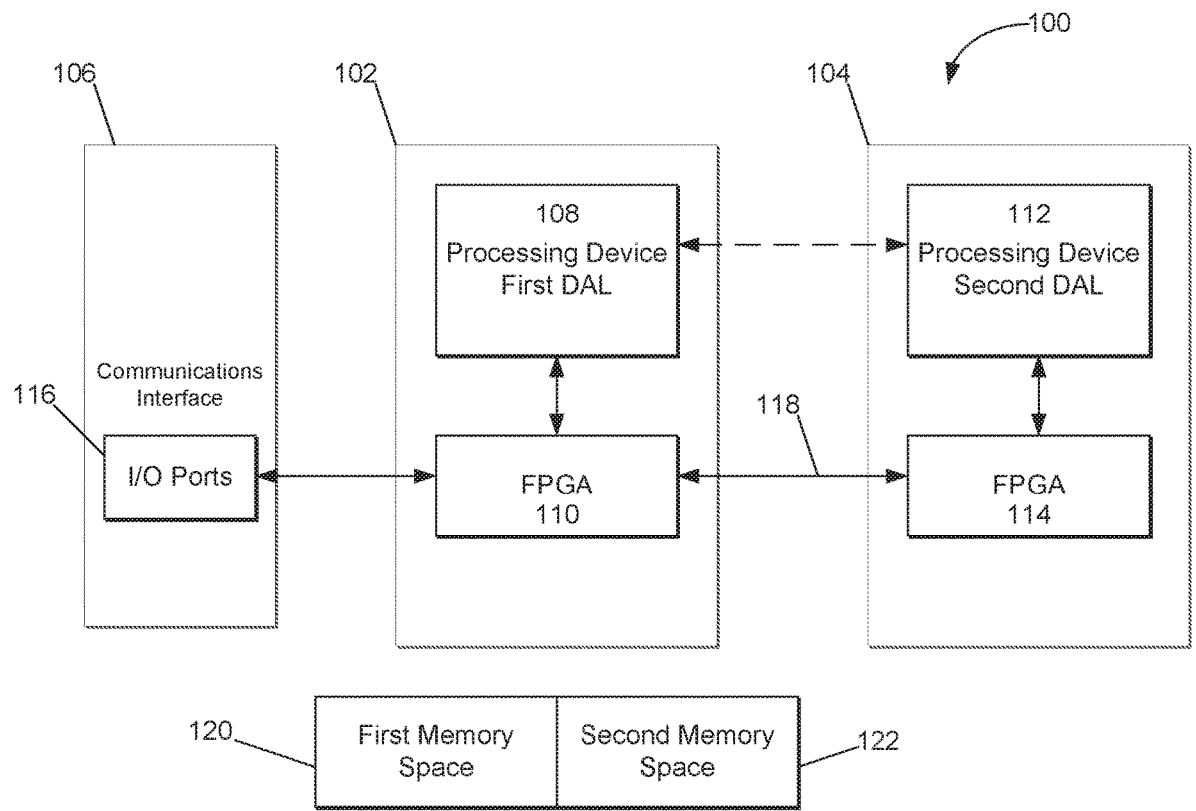
FIG. 1 depicts a block diagram of an example system for regulating data according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to regulating or controlling communications associated with one or more processors in a computing system. For instance, the computing system can include a first processing board and a second processing board. The first processing board can include a first processing device and a first control logic device, and the second processing board can include a second processing device and a second control logic device. In some implementations, the first and second processing devices can be software processing devices, and the first and second control logic devices can be hardware control devices. For instance, the first and second control devices can include logic hardware devices, application-specific integrated circuits, field-programmable gate array devices, discrete logic circuits, and/or other suitable hardware control devices. The computing system can further include a communications interface communicatively coupled to the first processing board. The communications interface can be configured to facilitate communication between the avionics system and one or more external devices. The first control device of the first processing board can be communicatively coupled to the second control device of the second processing board via a shared bus.

More particularly, the first processing device can host a first software application associated with a first design assurance level (DAL). The second processing device can host a second software application associated with a second DAL that is different than the first DAL. As will be understood by those skilled in the art, a DAL can dictate a level of rigor applied in the design and implementation of the software application. For instance, a DAL can be determined for one or more aspects of an avionics system based at least in part on a safety-criticality of the one or more aspects. For instance, a software application that has a high safety-criticality factor can be assigned a high DAL, and a software application that has a low safety criticality factor can be assigned a low DAL. Data associated with a software application having a particular DAL, can be afforded communication techniques and/or protections in accordance with the DAL. For instance, a DAL B software application can be afforded DAL communication techniques and/or protections in accordance with DAL B safety-criticality. As another example, a DAL D software application can be afforded DAL communication techniques and/or protections in accordance with DAL D safety-criticality.

In example implementations, the first and second control devices can be hardware devices, such as field-programmable gate array (FPGA) devices, application-specific integrated circuits, discrete circuits, and/or other suitable logic devices. The first control device can be communicatively coupled directly to the communications interface. The communications interface can include one or more input/output (I/O) ports to facilitate communication between the avionics system and one or more external devices. The first control device can be configured to regulate communication between the first and second processing devices and the communications interface. For instance, the first control device can be configured to grant communication access to the first processing device or the second processing device. In this manner, the first control device (e.g. the logic associated with the first control device) can act as a determining agent for determining communication access to the communications interface at any given moment.

According to example aspects of the present disclosure, the first control device can be communicatively coupled to the second control device via a shared bus. The first control device can be configured to provide one or more I/O signals associated with the communications interface to the second control device via the shared bus. For instance, the first control device can receive one or more input signals from the communications interface, and can output the one or more input signals to the second control device via the shared bus. The second control device can be configured to provide the signals received via the shared bus to the second processing device.

In some implementations, the first control device can be configured to provide one or more communication paths from the communications interface to the first processing device or the second processing device based at least in part on a priority of the processing devices. For instance, first control device can receive a signal indicative of a request to access the communications interface (e.g. a particular port of the communications interface) from the first processing device or the second processing device. The first control device can determine a current communication status associated with the port, and can determine whether to grant communication access to the provider of the request (e.g. the first processing device or the second processing device) based at least in part on the current status and the priority of the processing devices.

The current communication status associated with the system can indicate which, if any, processing device is currently in communication with the requested port. For instance, the communication status can indicate that the first processing device is currently communicating with the port, that the second processing device is currently communicating with the port, or that neither processing device is currently communicating with the port. The priority of the processing devices can be determined based at least in part on the DAL associated with the devices. In some implementations, the processing device having the higher DAL can receive a higher priority than the processing device having the lower DAL.

According to example aspects of the present disclosure, when the first control device receives a request to communicate with the communications interface, the first control device can determine whether to grant communication access to the requester based at least in part on the current communication status. For instance, responsive to receiving a communication request, the first control device can identify or determine the current communications status. If the current communications status indicates that neither processing device is currently communicating with the requested port, the first control device can couple the requesting device to the communications interface (e.g. to the port). If the requesting device is the second processing device, the first control device can couple the second processing device to the communications interface via the shared bus and the second control device. If the current communications status indicates that the processing device having the lower DAL is currently communicating with the port (e.g. and the processing device having the higher DAL is the requesting device), communication access of the lower DAL device can be interrupted and communication access to the requesting device can be provided. In addition, all I/O communications from the port to the lower DAL processing device can be ceased.

If the current communications status indicates that the processing device having the higher DAL is currently communicating with the port (e.g. and the processing device having the lower DAL is the requesting device), communication access to the requesting device can be denied. In this manner, a processing device having a lower DAL than a processing device that is currently communicating with the port cannot gain communication access while the higher DAL processing device is communicating with the port.

In some implementations, the first control device can be configured as one or more multiplexer devices configured to regulate communication access to the communications interface. For instance, communication to one or more I/O ports associated with the communications interface can be regulated by the multiplexer devices. The multiplexer inputs can be coupled to the first and second processing devices, and the multiplexer output can provide a communication line to a particular port associated with the communications interface. The multiplexer device can be configured select an input and to forward the selected input to the single line output based at least in part on the communication status and the priority of the processing devices. In this manner, the multiplexer device can be configured to selectively couple the first and second processing devices to the desired port. In some implementations, the FPGA can be configured to provide such multiplexer functionality to each I/O port of the communications interface. For instance, the FPGA can be configured to selectively couple each port to the first and second processing devices using such multiplexer functionality.

In some implementations, communications associated with the first processing device can be partitioned from communications associated with the second processing device. For instance, data indicative of communications associated with the first processing device can be written to a first memory space, and data indicative of communications associated the second processing device can be written to a second memory space that is separated from the first memory space. In some implementations, the first memory space can be a first memory partition and the second memory space can be a second memory partition. In this manner, the data being processed for each software application can be controlled such that no crosstalk occurs between software applications, and that the data associated with the lower DAL software application does not corrupt the data associated with the higher DAL software application.

Regulating system communications by the first control device can provide increased communication efficiency compared to system communication regulation using software techniques. For instance, such control device regulation can remove the need for data processing through the software application(s) prior to arrival of the data at the software processing device. As indicated, conventional implementations can implement a communication path that routes data from the first control device to the second control device via the first and second processing devices. Example implementations of the present disclosure provide a communication path wherein data can be communicated directly between the control devices via the shared bus (e.g. without a need to route the data through the processing devices). In this manner, the first control device can be configured to regulate the data communication of the processing devices.

With reference now to the figures, example aspects of the present disclosure will be discussed in greater detail. For instance, FIG. 1 depicts an example avionics system 100 for regulating communication with one or more external devices according to example embodiments of the present disclosure. System 100 includes a first processing board 102, a second processing board 104 and a communications interface 106. First processing board 102 includes a processing device 108 and an FPGA 110. For instance, processing device 108 can correspond to a first processing device and FPGA 110 can correspond to a first control device. Processing device 108 can host a first software application, and can be associated with a first DAL. Processing board 104 includes a processing device 112, and an FPGA 114. Processing device 112 can correspond to a second processing device, and FPGA 114 can correspond to a second control device. Processing device 112 can host a second software application, and can be associated with a second DAL. The first DAL can be associated with processing board 102, and can be a higher DAL than the second DAL associated with processing board 104. For instance, in some implementations, the first DAL can be a level A DAL or a level B DAL, and the second DAL can be a level D DAL or a level E DAL. It will be appreciated that various other suitable DAL configurations can be used without deviating from the scope of the present disclosure.

FPGA 110 can be directly coupled to one or more I/O ports 116 implemented within or otherwise associated with communications interface 106. I/O ports 116 can be configured to facilitate communication between system 100 and one or more external devices or systems. FPGA 110 can further be coupled directly to FPGA 114 via a shared bus 118. For instance, shared bus 118 can act as an inter-FPGA link. In some implementations, shared bus 118 can be a SERDES bus. Data can be provided directly between FPGA 110 and FPGA 114 via shared bus 118. For instance, one or more I/O signals associated with communications interface 106 can be provided to shared bus 118 for communication between FPGA 110 and FPGA 114.

FPGA 110 can include internal control logic configured to regulate communications between processing devices 108, 112 and communications interface 106. For instance, in some implementations, FPGA 110 can implement a control logic configuration associated with one or more multiplexer devices configured to selectively couple processing device 108 and processing device 112 (e.g. via FPGA 114) to one or more I/O ports 116. As indicated, in some implementations, FPGA 110 can receive communication signals from I/O ports 116, and can output the signals on shared bus 118. In this manner, FPGA 114 can communicate the communication signals to processing device 112 in accordance with an implementation or execution of the second software application (e.g. in accordance with a request for data from and I/O port by the second software application).

In some implementations, FPGA 110 can provide access to communications interface 106 to processing device 108 or processing device 112. For instance, FPGA 110 can receive a communication request from a requesting device. The communication request can be a request to access a particular I/O port 116. The requesting device can be processing device 108 or processing device 112. FPGA 110 can then determine whether to grant communication access to the requesting device based at least in part on a current communication status and/or a priority associated with system 100. For instance, FPGA 110 can determine the current communication status to identify whether the I/O port 116 is currently in communication with a processing device. For instance, in the implementation depicted in FIG. 1 wherein system 100 includes two processing devices, FPGA 110 can determine whether the non-requesting processing device is in communication with the I/O port 116. In implementations wherein more than two processing devices are included, FPGA 110 can determine which, if any of the more than two processing devices are currently in communication with the I/O port 116.

As indicated above, if the I/O port 116 is not currently communicating with a processing device, FPGA 110 can provide communication access to the requesting device. For instance, if processing device 108 is the requesting device, the internal control logic of FPGA 110 can be configured to couple processing device 108 to the I/O port 116. If processing device 112 is the requesting device, FPGA 110 can be configured to couple processing device 112 to the I/O port 116 via shared bus 118. For instance, a communication path can be provided between I/O ports 116, FPGA 110, shared bus 118, FPGA 114, and processing device 112. In this manner, the communication path does not include processing device 108.

If the I/O port 116 is communicating with a processing device, a priority between the processing devices can be accessed or identified to determine whether to remove communication access from the processing device, and to grant communication access to the requesting device. For instance, if the requesting device has a higher priority than the currently communicating device, communications with the currently communicating device can be ceased, and communication access can be granted to the requesting device. If the requesting device has a lower priority than the currently communicating device, the communication request can be denied, and communications between the currently communicating device and the I/O port 116 can remain intact.

When communication between a processing device and the I/O port 116 is interrupted due to a request from a higher priority processing device, the communication can be resumed subsequent to a completion of the communication between the I/O port 116 and the higher priority processing device. For instance, if processing device 108 interrupts communications between the I/O port 116 and processing device 112, when communication between the I/O port 116 and processing device 108 is completed, communications between the I/O port 116 and processing device 112 can be resumed.

In some implementations, FPGA 110 can be configured to process or otherwise condition data received by FPGA 110 to protect the data in accordance with DAL requirements. For instance, if data associated with a lower DAL is requested by a processing device having a higher DAL, FPGA 110 can be configured to condition the lower DAL level based at least in part of the DAL of the requesting device. For instance, if processing device 108 requests data associated with a level D DAL from an I/O port 116, upon receiving the level D data, FPGA 110 can process or otherwise condition the data in accordance with the DAL associated with processing device 108 (e.g. level A or level B). In this manner, data associated with a lower DAL having a lower level of protection will not corrupt a higher DAL process that requires a higher level of protection.

System 100 further includes first memory space 120 and second memory space 122. FPGA 110 can configure first memory space 120 and second memory space 122, such that data associated with processing device 108 can be written to first memory space 120, and data associated with second processing device 112 can be written to second memory space 122. In some implementations, first memory space 120 can be a first memory partition, and second memory space 122 can be a second memory partition. Although first memory space 120 and second memory space 122 are external to processing board 102 and processing board 104 in FIG. 1, it will be appreciated that first memory space 120 and second memory space 122 can be located in various suitable positions, such as within processing board 102, processing board 122 and/or other suitable positions.

Processing device 108 and processing device 114 can include any suitable processing device, such as a controller, microprocessor, microcontroller, microcomputer, integrated circuit, logic device, programmable logic controller (PLC), an application specific integrated circuit, or other suitable processing device. First memory space 120 and/or second memory space 122 can include one or more computer-readable media, including, but not limited to, non-transitory computer-readable media, RAM, ROM, hard drives, flash drives, or other memory devices. In some implementations, first memory space 120 and/or second memory space 122 can store information accessible by the one or processing device 108 and/or processing device 114, including computer-readable instructions that can be executed by processing device 108 and/or processing device 114. The instructions can be any set of instructions that when executed by processing device 108 and/or processing device 114, cause processing device 108 and/or processing device 114 to perform operations in accordance with example embodiments of the present disclosure.

Figure 2:
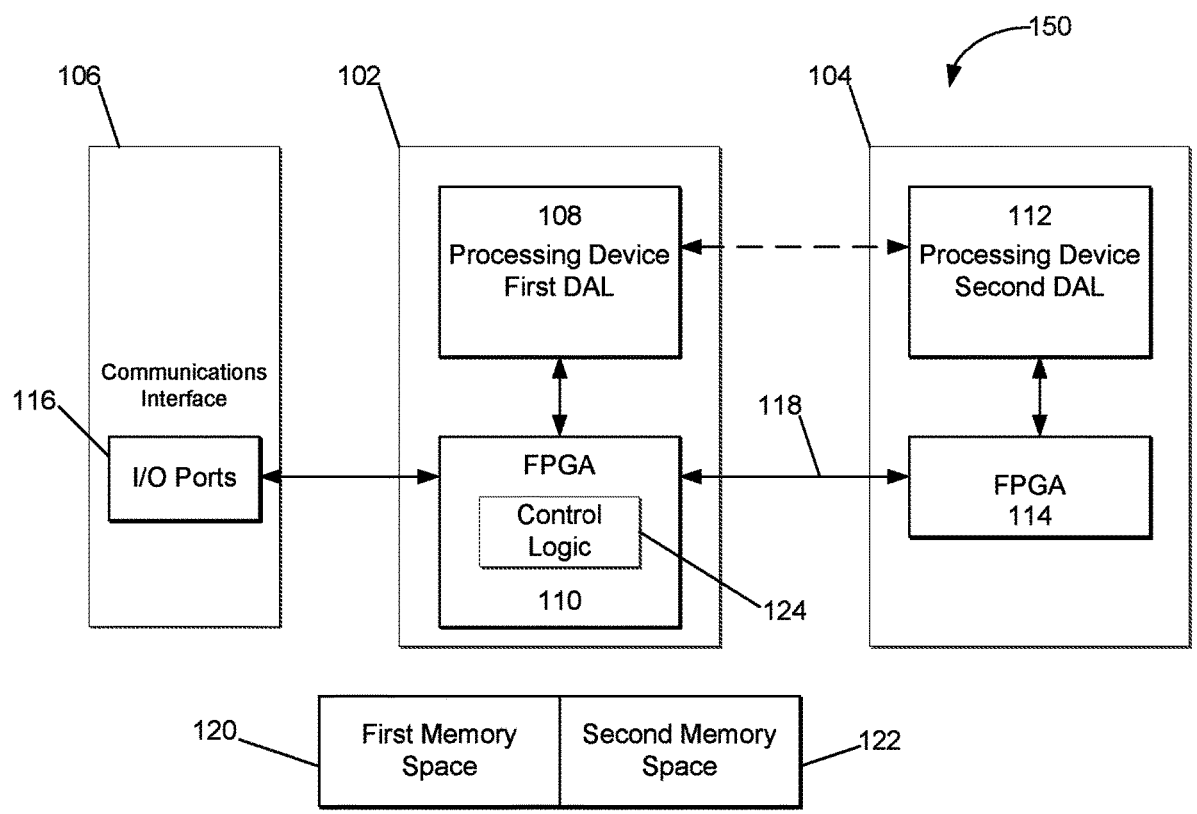
FIG. 2 depicts a block diagram of an example system for regulating data by implementing a multiplexer operation according to example embodiments of the present disclosure.

FIG. 2 depicts an additional implementation of a system 150 for regulating communication with one or more external devices according to example embodiments of the present disclosure. System 150 can correspond to system 100 or other computing system. In particular, system 100 depicts control logic 124 implemented by FPGA 110. As indicated above, FPGA 110 can include one or more logic circuits implemented for multiplexing operation. In this manner, the one or more logic circuits of FPGA 110 can include control logic 124. Control logic 124 can regulate data communication between communications interface 106 and one or more processing devices (e.g. processing device 108 and/or processing device 112). In particular, control logic 124 can be configured to implement multiplexer functionality to grant communication access to processing device 108 or processing device 112 according to example embodiments of the present disclosure. For instance, control logic 124 can grant communication access to processing device 108 or processing device 112 according to a predetermined priority assigned to the processing devices. As indicated, the priority can be determined based at least in part on a DAL level associated with the processing devices. In some implementations, control logic 124 can grant communication access based at least in part on a time scheme. For instance, control logic 124 can grant communication access to a processing device during one or more predetermined time windows associated with the processing device.

As indicated, control logic 124 can implement a multiplexer operation configured to selectively grant communication access to processing device 108 or processing device 112. In some implementations, control logic 124 may have separate logic to facilitate communication in the transmit and receive directions. For instance, control logic 124 may include multiplexer logic to facilitate communication of data from processing device 108 and/or processing device 112 to communications interface 106 according to example embodiments of the present disclosure. Control logic 124 may further include additional logic to facilitate communication of data from communications interface 106 to processing device 108 and/or processing device 112 according to example embodiments of the present disclosure.

The systems 100 and 150 depicted in FIGS. 1 and 2 are intended for illustrative purposes only. In particular, it will be appreciated by those skilled in the art that example embodiments of the present disclosure can be implemented within various other suitable computing systems. For instance, systems having other suitable numbers of FPGAs, processing boards, processing devices and/or DAL levels can be used without deviating from the scope of the present disclosure. In particular, in some implementations, processing device 108 and processing device 112 can be located on the same processing board. In some implementations, FPGA 110 and FPGA 114 can be located on the same processing board. In implementations wherein more than two processing devices are used, one or more additional shared busses can be used to couple the processing devices in accordance with example embodiments of the present disclosure. In some implementations, the control functionality associated with FPGA 110 and/or FPGA 114 can be implemented using various other suitable control devices, such as for instance, application-specific integrated circuits, discrete logic circuits, and/or other suitable control devices.

Figure 3:
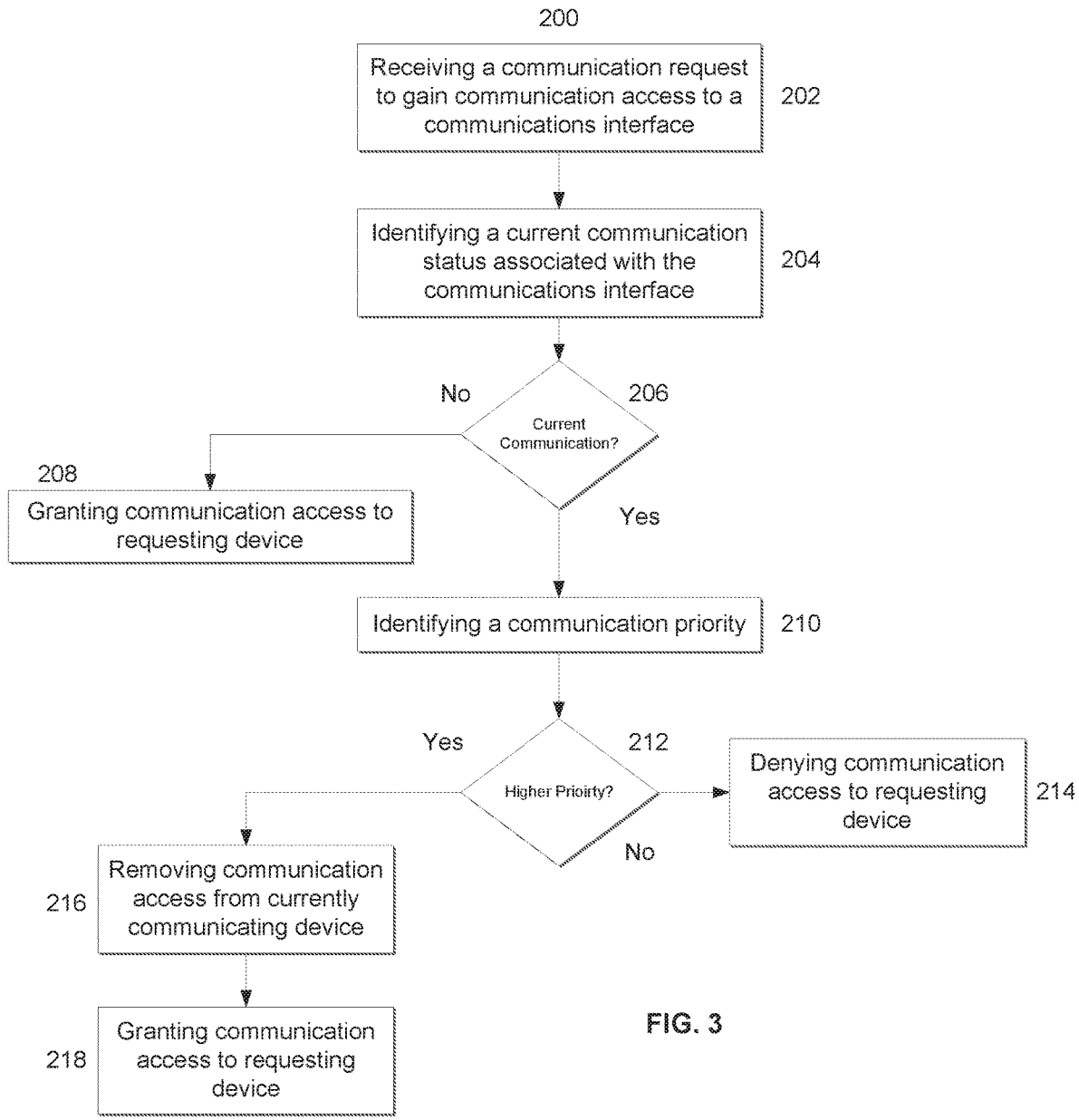
FIG. 3 depicts a flow diagram of an example method of regulating data associated with a computing system according to example embodiments of the present disclosure.

FIG. 3 depicts a flow diagram of an example method (200) of regulating communications associated with an avionics system. Method (200) can be implemented by one or more computing devices, such as one or more of the computing devices depicted in FIG. 1. For instance, in some implementations, method (200) can be performed by FPGA 110 of FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving a communication request to gain communication access to a communications interface associated with an avionics computing system. For instance, the communication request can be provided by one of a plurality of processing devices associated with the avionics computing system. In some implementations, the communication request can be a request to write or read data from the communications interface (e.g. to or from one or more I/O ports associated with the communications interface).

At (204), method (200) can include identifying a current communication status associated with the avionics computing system and/or the communications interface. As indicated, the current status can indicate whether a processing device is currently communicating with the requested port of the communications interface. In some implementations, the current status can provide an identity of a processing device that is currently communicating with the port.

At (206), method (200) can include determining whether the port is currently communicating with a processing device. If the port is not currently communicating with a processing device, at (208), method (200) can include granting communication access to the requesting device. For instance, granting communication access to the requesting device can include providing a communication path to the requesting device and the communications interface. For instance, if the requesting device is included on a processing board that is not directly connected to the communications interface, providing the communication path may include providing a communication path via a shared bus coupling a first logic control device to a second logic control device. In this manner, the communication path can bypass the non-requesting processing devices implemented in the system. If the requesting device is included on a processing board that is directly connected to the communications interface, providing a communication path can include coupling the requesting device to the communications interface via a control logic configuration of the control logic device associated with the processing board.

Referring back to (206), if the port is currently in communication with a processing device, at (210), method (200) can include identifying a communication priority associated with the processing devices of the system. As indicated above, the communication priority can be determined based at least in part on a DAL level associated with the processing device. For instance, processing devices associated with higher DAL levels can have a higher priority than processing devices associated with lower DAL levels. In some implementations, each processing device of the system can be associated with a different DAL level. In this manner, the system can be configured to regulate communications of multiple DAL level processing devices.

At (212), method (200) can include determining whether the requesting device has a higher communication priority than the currently communicating device. If the requesting device does not have a higher priority than the currently communicating device, at (214), method (200) can include denying communication access to the requesting device. In this manner, communication access is not provided to the requesting device, and the currently communicating device can maintain communication with the communications interface.

Referring back to (212), if the requesting device has a higher communication priority than the currently communicating device, at (216), method (200) can include removing communication access from the currently communicating device. For instance, removing communication access from the currently communicating device can include decoupling the currently communicating device from the communications interface by breaking a communication path from the currently communicating device to the communications interface.

At (218), method (200) can include granting communication access to the requesting device. As indicated, granting communication access to the requesting device can include coupling the requesting device to the port by providing a communication path from the communications interface to the requesting device. In some implementations, the communication path can bypass the non-requesting device. For instance, if the requesting device is implemented on a processing board that is not directly connected to the communications interface, the communication path can include a path between one or more control logic devices via one or more shared busses coupling the control logic devices.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computing system comprising: a first processing board comprising a first processing device and a first field-programmable gate array device, the first processing device being separate from the first field-programmable gate array device, the first processing device communicatively coupled to the first field-programmable gate array device; a second processing board comprising a second processing device and a second control device, wherein the second control device is a second field-programmable pate array, the second processing device being separate from the second control device, the second processing device communicatively coupled to the second control device; and a communications interface comprising one or more input/output ports configured to facilitate communication between the computing system and one or more external devices; wherein the first field-programmable gate array device of the first processing board is communicatively coupled to the second control device of the second processing board via a shared bus, and is communicatively coupled to the input/output ports, wherein the first field-programmable gate array device is configured to regulate all communications between the communications interface and the first processing device and all communications between the communications interface and the second processing device, via the second processor's second control device, and wherein in regulating all of the communications between the communications interface and the second processing device, the first field-programmable gate array device provides a communication path between the communications interface and the second processing device that does not include the first processing device.

2. The computing system of claim 1, further comprising:
a first memory space;
a second memory space, and
wherein the first field-programmable gate array device configures the first memory space and the second memory space such that data associated with the first processing device is written to the first memory space and data associated with the second processing device is written to the second memory space.

3. The computing system of claim 2, wherein the first field-programmable gate array device is configured to selectively couple the communications interface to the second processing device via the shared bus.

4. The computing system of claim 1, wherein the first field-programmable gate array device is configured to:
receive one or more communication requests;
identify a current communications status associated with the computing system; and
provide communication access to the first processing device or the second processing device based at least in part on the communication status.

5. The computing system of claim 4, wherein the first field-programmable gate array device is configured to provide communication access to the second processing device by providing the communication path via the shared bus.

6. The computing system of claim 1, wherein the first processing device is configured to host a first software application associated with a first design assurance level, and wherein the second processing device is configured to host a second software application associated with a second design assurance level.

7. The computing system of claim 6 wherein the first processing board is associated with the first design assurance level, and wherein the second processing board is associated with the second design assurance level.

8. The computing system of claim 6, wherein the first design assurance level is a higher design assurance level than the second design assurance level.

9. The computing system of claim 8, wherein first processing device is given communication priority over the second processing device.

10. The computing system of claim 1, wherein the second control device is a second field-programmable gate array device.

11. The computing system of claim 1, wherein in regulating all of the communications between the communications interface and the first processing device, the first field-programmable gate array device provides a communication path between the communications interface and the first processing device that does not include the second processing device.

12. An aircraft, comprising: one or more computing systems, comprising: a first processing device coupled to a first control device, wherein the first control device is a first field-programmable gate array, the first processing device being separate from the first control device; a second processing device coupled to a second control device, wherein the second control device is a second field-programmable gate array, the second processing device being separate from the second control device; and a communications interface communicatively coupled to the first control device, the communications interface comprising one or more input/output communication ports configured to facilitate communication between the one or more computing systems and one or more external devices; wherein the first control device is communicatively coupled to the second control device via a shared bus, and is communicatively coupled to the input/output ports, wherein the first control device is configured to regulate all communications between the first processing device and the communications interface and the second processing device, via the second processor's second control device, and the communications interface, and wherein in regulating all of the communications between the communications interface and the second processing device, the first field-programmable gate array device provides a communication path between the communications interface and the second processing device that does not include the first processing device and in regulating all of the communications between the communications interface and the first processing device, the first field-programmable gate array device provides a communication path between the communications interface and the first processing device that does not include the second processing device.

13. The aircraft of claim 12, wherein the first control device is configured to selectively couple the communications interface to the first processing device or the second processing device.

14. The aircraft of claim 13, wherein the first control device is configured to selectively couple the communications interface to the second processing device via the shared bus.

15. The aircraft of claim 13, wherein the first control device is configured to:
receive a communication request to access a first communication port associated with the communications interface;
identify a current communications status associated with the first communication port; and provide communication access to the first processing device or the second processing device based at least in part on the communication status.

16. The aircraft of claim 12, wherein the first processing device and the first control device are located on a first processing board, and wherein the second processing device and the second control device are located on a second processing board.

17. The aircraft of claim 12, wherein the first control device comprises one or more logic circuits configured as a multiplexer device, and wherein the one or more logic circuits configured as the multiplexer device are configured to regulate communications associated with the communications interface.

18. A method of regulating data associated with a computing system, the method comprising: receiving, by a first control logic device associated with a computing device, a communication request to gain communication access to a communication port associated with a communications interface of a computing system, the computing system comprising a first processing board comprising a first processing device and the first control logic device, wherein the first control device is a first field-programmable gate array, the first processing device being separate from the first control logic device, the computing system further comprising a second processing board comprising a second processing device and a second control logic device, wherein the second control device is a second field-programmable gate array, the second processing device being separate from the second control device; a communications interface comprising one or more input/output ports; wherein the first control logic device is coupled to the second control logic device via a shared bus and is communicatively coupled to the input/output ports; identifying, by the first control logic device, a current communications status associated with the communication port; determining, by the first control logic device, a priority order between the first processing device and the second processing device, and wherein the first processing device is given communication priority over the second processing device; and providing, by the first control logic device, access to the communication port to the first processing device or the second processing device based at least in part on the communications status and the priority order, wherein the first and second control logic devices are first and second processing devices, and wherein when the first control device provides access to the first processing device based at least in part on the communications status and the priority order, the first control device provides a communication path between the communication port and the first processing device that does not include the second processing device and when the first control device provides access to the second processing device, the first control device provides a communication path between the communication port and the second processing device that does not include the first processing device; wherein the first control device communicates with the second processing device via the second processing device's second control device.

19. The method of claim 18, wherein the first control logic device is a field-programmable gate array device.

20. The method of claim 18, wherein providing access to the communication port to the second processing device comprises coupling the communications interface to the second processing device via the shared bus.

* * * * *